C. D. FARMER.
SCARIFIER.
APPLICATION FILED JAN. 22, 1917.
1,237,186.
Patented Aug. 14, 1917.
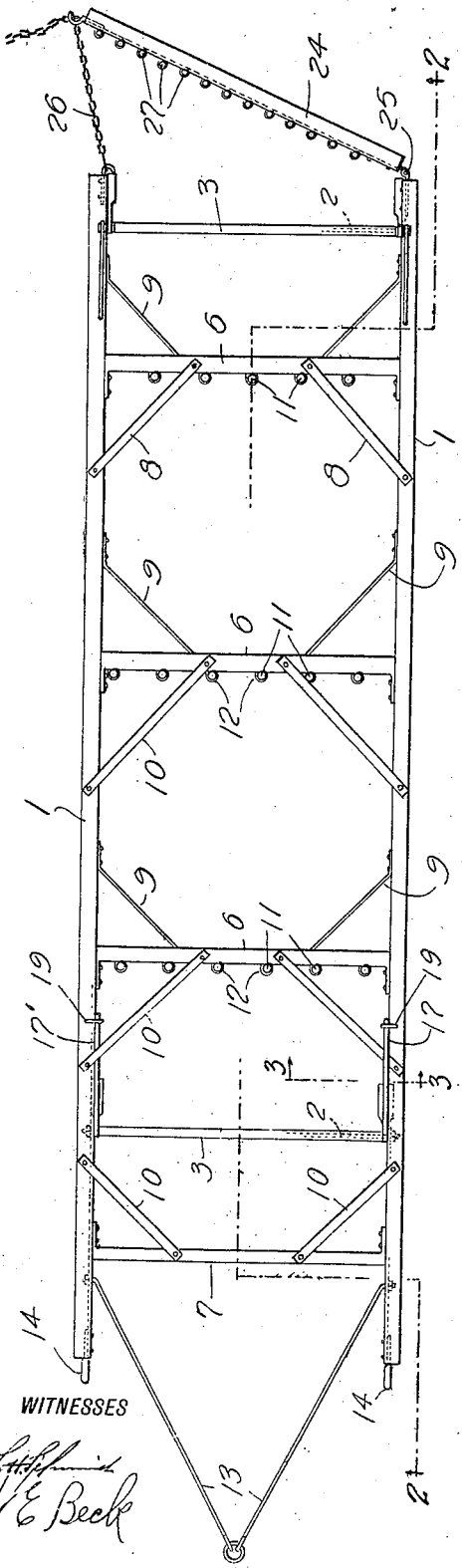
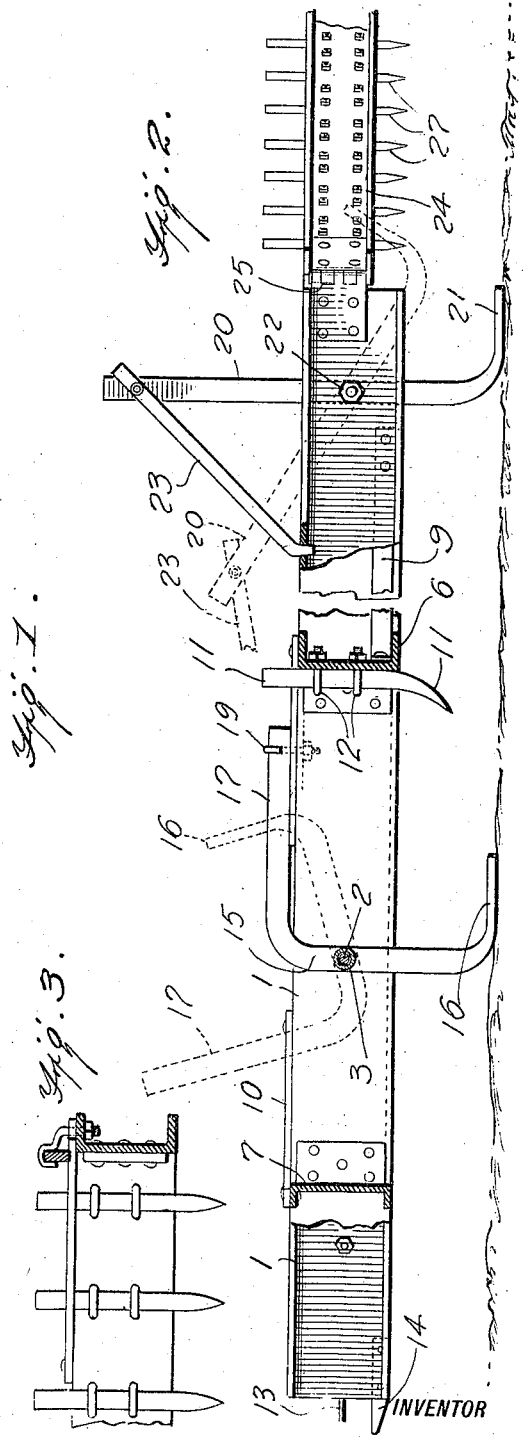
WITNESSES
INVENTOR
Cornelius D. Farmer,
BY
ATTORNEYS

UNITED STATES PATENT OFFICE.

CORNELIUS D. FARMER, OF EUGENE, OREGON.

SCARIFIER.

1,237,186.           Specification of Letters Patent.     Patented Aug. 14, 1917.

Application filed January 22, 1917. Serial No. 143,635.

*To all whom it may concern:*

Be it known that I, CORNELIUS D. FARMER, a citizen of the United States, and a resident of Eugene, in the county of Lane and State of Oregon, have made certain new and useful Improvements in Scarifiers, of which the following is a specification.

My invention is an improvement in scarifiers, and has for its object to provide a device of the character specified for tearing loose clods, stone and the like too near the surface of the road, and for removing the torn loose stone and the like from the side of the road.

In the drawings, Figure 1 is a top plan view of the scarifier.

Figs. 2 and 3 are sections on the line 2—2 and 3—3 of Fig. 1, each view looking in the direction of the arrows adjacent to the line.

In the present embodiment of the invention, a frame is provided consisting of channel-shaped longitudinal bars 1, arranged with their channels facing in opposite direction, and these bars are connected at their ends by rods 2, and are spaced apart by pipes 3, arranged on the rods between the side bars. The bars are also connected by cross plates 6, which carry teeth, and by a cross bar 7, near the front. The bars 6 are braced against the side bar, by braces 8 and 9, and the bar 7 is braced by similar braces 10.

Each of the bars 6 carries a series of teeth 11, six in the present instance, the said teeth 11 being connected to the cross bars by means of clips 12. It will be noticed that each of the teeth curves forwardly at its lower end and the said lower ends are pointed to engage and tear up the surface of the road.

The frame is drawn by draft animals or a motor, and draft mechanism indicated at 13 is connected with the front ends of the side bars. A shoe 14 is arranged at the front end of each side bar, the shoes being beveled as shown, in order to lift the front end of the side bars over slight obstructions, and to prevent the said front ends from engaging such obstructions directly.

During transportation, the frame is supported by front and rear skids, and these skids are arranged to be folded out of engaging position to permit the teeth to engage the ground. When the skids are in operative position they support the frame with teeth out of engagement with the ground. Each front skid is a bar consisting of a body portion 15 having at one end a shoe 16, and at the other end an angular portion 17. The body portions of the skids are pivoted to the side bars, as indicated at 18, in such manner that the skids may be moved into the full line position of Fig. 2, or in the dotted line position of the said figure.

The shoes 16 extend at approximately a right angle to the bodies of the skid, and in the same direction as the angular portion 17, and when the skids are in the full line position of Fig. 2, the shoes will engage and slide upon the ground, holding the teeth out of operative position.

Latch mechanisms 19 are provided for holding the skids in operative position, each of the said latch mechanisms consisting of a staple hinged to the side bar, and engaging over the free end of the angular portion 17 to hold the said portion in contact with the side bar. Each of the rear skids is a bar 20 having at its lower end a shoe 21 extending at approximately right angles to the bar and the bar is pivoted to the side bars, as indicated in Fig. 2.

The shoes 21 are spaced below the side bars when the skids are in operative position the same distance as the skids 16 are spaced below the side bars. Each of the rear skids is held in operative position by a latch bar 23 which is pivoted at one end to the upper end of the skid, and is adapted to engage at the other end an opening in the side bar. When the latch bar is engaged with the opening, the skid will be held in vertical position, while when the latch bar is disengaged from the opening, the skid may be swung into the dotted line position of Fig. 2, to permit the teeth to engage with the ground.

At the rear of the frame is arranged a take-up or deflector for collecting the larger stones, clods, and the like, that have been torn up by the teeth, and removing them to the side of the road. This mechanism comprises a channel bar 24, which is hinged at one end, to one of the side bars 1, as indicated at 25, and the other end is connected to the other side bar by a chain 26.

The chain 26 is connected with the side bar, and with a hook on the channel bar 24, so that engaging the hook with different links, the inclination of the channel bar may be varied.

A series of teeth 27 is connected with the channel bar, the said bar being arranged with the channel rearwardly, and the teeth being connected with the front of the bar.

In operation, the improved scarifier is drawn along the surface of the road with the teeth in engagement with the surface. It will be evident that the surface of the road will be torn up, all rocks, clods and the like too high above the surface being dislodged. The take-up will collect the dislodged rocks, and clods, and will deliver them to one side of the road.

During the transportation or when it is not desired to tear up the road, the skids are arranged as shown, in Fig. 2, to support the frame with the teeth out of contact with the road surface.

I claim:

1. A device of the character specified comprising a supporting frame consisting of side bars and connecting cross bars, a series of teeth on each cross bar, shaft mechanism connected with the front end of the frame, and skids for holding the frame with the teeth out of contact with the ground, each skid consisting of a bar pivoted to the frame and provided at its lower end with a shoe, and releasable means for holding the bar in vertical position, a take-up mechanism at the rear of the frame for collecting the dislodged material and deflecting it to the side of the road.

2. A device of the character specified comprising a supporting frame, teeth connected to the frame, draft mechanism connected with one end of the frame, a take-up mechanism at the rear of the frame for taking the torn up material and delivering it to the side of the road, said mechanism comprising a bar hinged at one end to the frame, a flexible connection between the frame and the other end of the bar, and adjusted to vary the inclination of the bar, said bar having collecting teeth.

CORNELIUS D. FARMER.

Copies of this patent may be obtained for five cents each, by addressing the "Commissioner of Patents, Washington, D. C."